(12) United States Patent
Gagnon

(10) Patent No.: US 12,521,934 B2
(45) Date of Patent: Jan. 13, 2026

(54) SYSTEM AND METHOD FOR SHAPING A DUCT SECTION

(71) Applicant: PLASTIQUES G PLUS INC., Rouyn-Noranda (CA)

(72) Inventor: Dan Gagnon, Rouyn-Noranda (CA)

(73) Assignee: PLASTIQUES G PLUS INC., Rouyn-Noranda (CA)

( * ) Notice: Subject to any disclaimer, the term of this patent is extended or adjusted under 35 U.S.C. 154(b) by 0 days.

(21) Appl. No.: 18/724,804

(22) PCT Filed: Jun. 16, 2022

(86) PCT No.: PCT/CA2022/050969
§ 371 (c)(1),
(2) Date: Jun. 27, 2024

(87) PCT Pub. No.: WO2023/150863
PCT Pub. Date: Aug. 17, 2023

(65) Prior Publication Data
US 2025/0162235 A1    May 22, 2025

(51) Int. Cl.
*F24F 13/02*    (2006.01)
*B29C 55/28*    (2006.01)
(Continued)

(52) U.S. Cl.
CPC ........ *B29C 55/285* (2013.01); *F24F 13/0245* (2013.01); *B29L 2023/001* (2013.01); *E21F 1/04* (2013.01)

(58) Field of Classification Search
CPC ................. F24F 13/0245; E21F 1/04
See application file for complete search history.

(56) References Cited

U.S. PATENT DOCUMENTS 3,491,800 A * 1/1970 Holton .................... F16L 31/00
                                                            138/155
4,410,014 A * 10/1983 Smith ................. F24F 13/0263
                                                            138/131
(Continued)

FOREIGN PATENT DOCUMENTS

CH          684898 A5 *  1/1995 ............. B26D 3/163
DE         2452512 A1 *  5/1976 ................ E21F 1/04
(Continued)

OTHER PUBLICATIONS

Machine translation of CH 684898 A5, pp. 1-14. (Year: 1995).*

*Primary Examiner* — Jermie E Cozart
(74) *Attorney, Agent, or Firm* — Lavery, de Billy, L.L.P.; Gonzalo Lavin

(57) ABSTRACT

System and method for shaping a duct section. The duct section is configured to be expandable from a flattened configuration to an expanded configuration. The system includes an inflatable enclosure insertable within the duct section while being in the flattened configuration. The inflatable enclosure defines an opening for inflating the inflatable enclosure. The system also includes a blower for inflating the inflatable enclosure through the opening from a deflated configuration to an inflated configuration. In use, when the inflatable enclosure is inserted within the duct section, the blower inflates the inflatable enclosure through the opening from the deflated configuration to the inflated configuration, whereby the duct section expands from the flattened configuration to the expanded configuration as the inflatable enclosure pushes against the duct section from within.

10 Claims, 9 Drawing Sheets

(51) Int. Cl.
*B29L 23/00* (2006.01)
*E21F 1/04* (2006.01)

(56) References Cited

U.S. PATENT DOCUMENTS

| | | | | |
|---|---|---|---|---|
| 5,077,873 A | * | 1/1992 | Strudel | D06C 5/00 |
| | | | | 26/80 |
| 2012/0125472 A1 | * | 5/2012 | Pinkalla | F16L 3/18 |
| | | | | 29/428 |
| 2020/0386438 A1 | | 12/2020 | Rusek, Jr. et al. | |

FOREIGN PATENT DOCUMENTS

| | | | | | |
|---|---|---|---|---|---|
| GB | 695047 A | * | 8/1953 | | E21F 1/04 |
| GB | 2188695 A | * | 10/1987 | | B29C 49/26 |
| WO | WO-2013030621 A1 | * | 3/2013 | | E21F 1/04 |

* cited by examiner

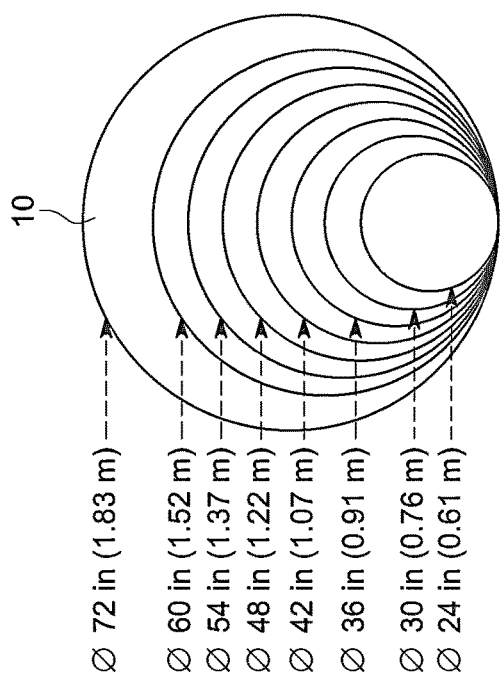
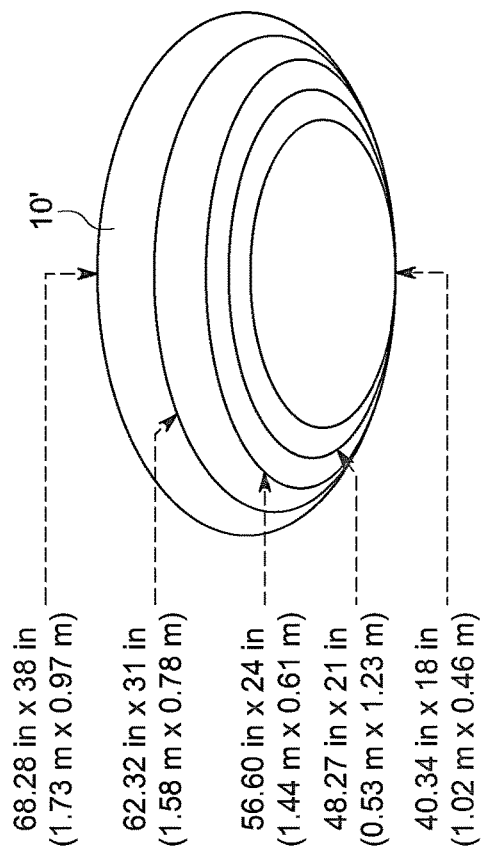
FIG. 10

SYSTEM AND METHOD FOR SHAPING A DUCT SECTION

CROSS-REFERENCE TO RELATED APPLICATIONS

This application is a National Entry Application of PCT application No. PCT/CA2022/050969 filed on Jun. 16, 2022 and published in English under PCT Article 21 (2), which itself claims benefit of Canadian patent application Serial No. 3, 148,677, filed on Feb. 14, 2022. All documents above are incorporated herein in their entirety by reference.

FIELD OF THE INVENTION

The present invention relates to a method for shaping ducts, such as for example mining ducts.

BACKGROUND OF THE INVENTION

Ducts are conduits or passages used in heating, ventilation, and air conditioning to deliver and remove air. The needed airflows include, for example, supply air, return air, and exhaust air. Ducts commonly also deliver ventilation air as part of the supply air.

Referring to FIG. 1, there is shown a known method for shaping duct sections 10 that are installed for example in underground mining. The duct sections 10 are typically made of pliable, semi-rigid plastic material or the like, as known by persons skilled in the art. Each duct section 10 is normally shipped in a folded configuration for ease of transportation. At the installation site, the duct sections 10 are unpacked from a transport crate and laid on the floor in a flattened configuration. Each duct section 10 may be about 3 feet to 9 feet (0.91 to 2.74 meters) wide when in the flattened configuration and about 8 to 10 feet (2.44 to 3.05 meters) in length. Each duct section 10 is then manually reshaped to a desired shape, such as oval or round. In a round shaped configuration, the duct section 10 may have a diameter of about 2 feet to 7 feet (0.61 to 2.13 meters). Arrows 12 illustrate manual pressure that is applied by installers to un-flatten and shape each duct section 10. Thereafter, two metallic rings 14 are inserted around the ends of each duct section 10 as illustrated by arrows 16 so as to maintain the round configuration of the duct section 10. Finally, the duct sections 10 are lifted as illustrated by arrow 18 and inserted into position with one another, while the ducts sections 10 are adjusted to follow a drift curvature.

The main drawbacks of the above prior art method are that it requires several workers to manually shape the duct sections and it is time consuming operation. In addition, workers have to exert relatively strong forces to shape the duct sections 10 and not everyone may have the required strength to do so.

There is therefore a need for an improved system and method to shape duct sections that would require a lower number of workers and not as much physical strength from an installer.

SUMMARY OF THE INVENTION

According to the present invention, there is provided a system for shaping a duct section, the duct section configured to expand from a flattened configuration to an expanded configuration, the system comprising: an inflatable enclosure insertable within the duct section while being in the flattened configuration, the inflatable enclosure defining an opening for inflating the inflatable enclosure; and a blower for inflating the inflatable enclosure through the opening from a deflated configuration to an inflated configuration; wherein when the inflatable enclosure is inserted within the duct section, the blower inflates the inflatable enclosure through the opening from the deflated configuration to the inflated configuration, whereby the duct section expands from the flattened configuration to the expanded configuration as the inflatable enclosure pushes against the duct section from within.

In embodiments, the system further comprises a cap for closing the opening and sealing the inflatable enclosure.

In embodiments, the inflatable enclosure may comprise plastic material, aramid material (such as Kevlar™), fabric material or combinations thereof.

In embodiments, there is also provided a method for shaping a duct section, the duct section being configured to expand from a flattened configuration to an expanded configuration, the method comprising: inserting an inflatable enclosure within the duct section while being in the flattened configuration, the inflatable enclosure defining an opening for inflating the inflatable enclosure; and inflating the inflatable enclosure with a blower through the opening from a deflated configuration to an inflated configuration, whereby the duct section expands from the flattened configuration to the expanded configuration as the inflatable enclosure pushes against the duct section from within.

In embodiments, the method comprises closing the opening with a cap or valve for sealing the inflatable enclosure.

In embodiments, the method comprises installing a ring around an end of the duct section to maintain the expanded configuration of the duct section.

In embodiments, the method comprises deflating the inflatable enclosure after the duct section has reached the expanded configuration.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

FIG. 10 is a schematic view of different sizes of shaped ducts, according to preferred embodiments of the present invention.

DESCRIPTION OF ILLUSTRATIVE EMBODIMENTS

The present invention is illustrated in further details by the following non-limiting examples.

Figure 1:
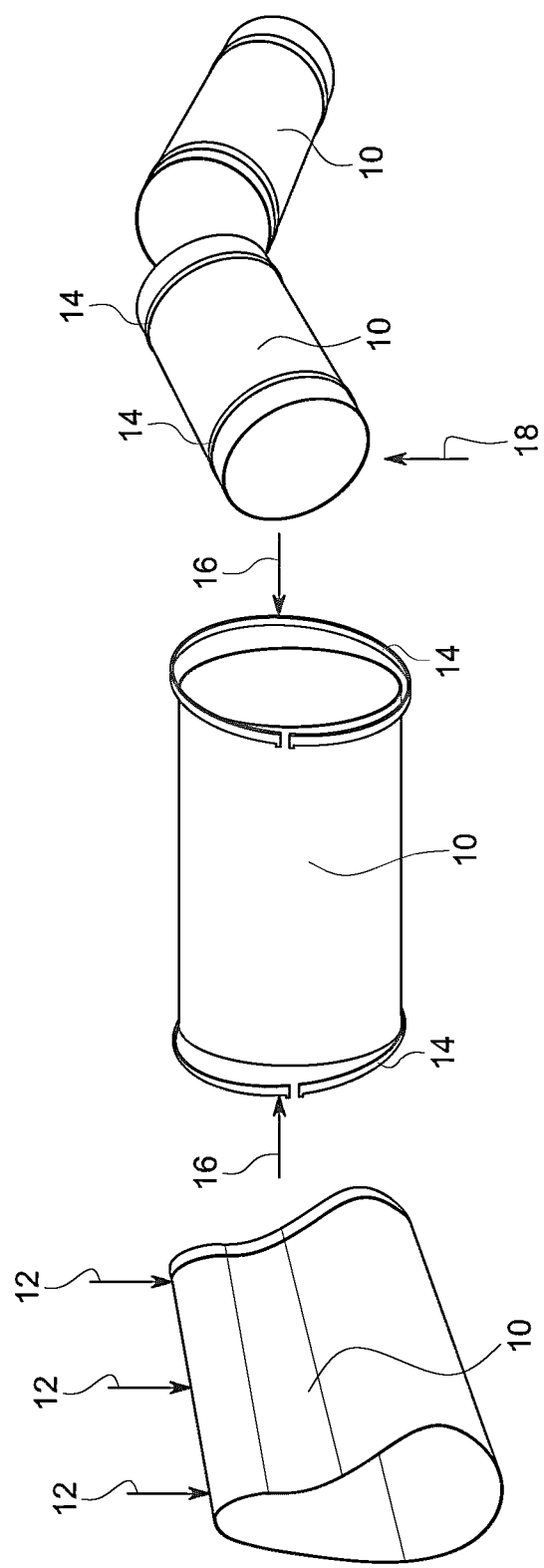
FIG. 1 is schematic diagram illustrating a known method for shaping a duct section.
Figure 2:
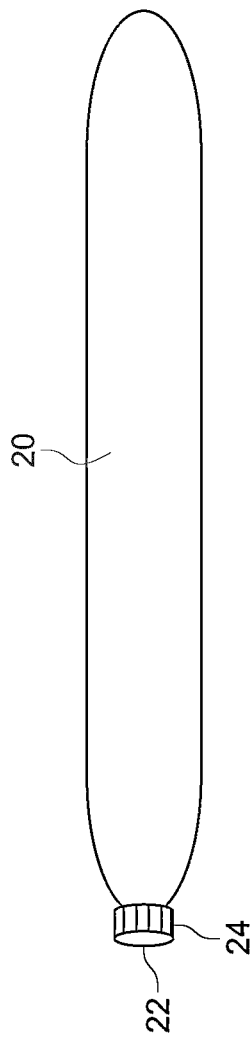
FIG. 2 is a schematic diagram of an inflatable enclosure in a deflated configuration, according to a preferred embodiment of the present invention.

Referring to FIG. 2, there is shown a schematic diagram of an inflatable enclosure 20 in a deflated configuration. The inflatable enclosure 20 defines an opening 22 for inflating the inflatable enclosure 20. The inflatable enclosure 20 may be made of any suitable material strong enough to allow for expansion and exert a sufficient force against a duct section 10 to be shaped from within. A cap 24 or valve 24' may be used to seal the opening 22. The inflatable enclosure 20 may be provided with more than one opening 22, with each opening having a corresponding cap or valve to seal the opening.

The inflatable enclosure 20 may be made of any suitable plastic material, and/or aramid material (such as Kevlar™), and/or fabric material or combinations thereof. The materials of the inflatable enclosure 20 must be strong enough to push the inner walls of the duct section 10.

Figure 3:
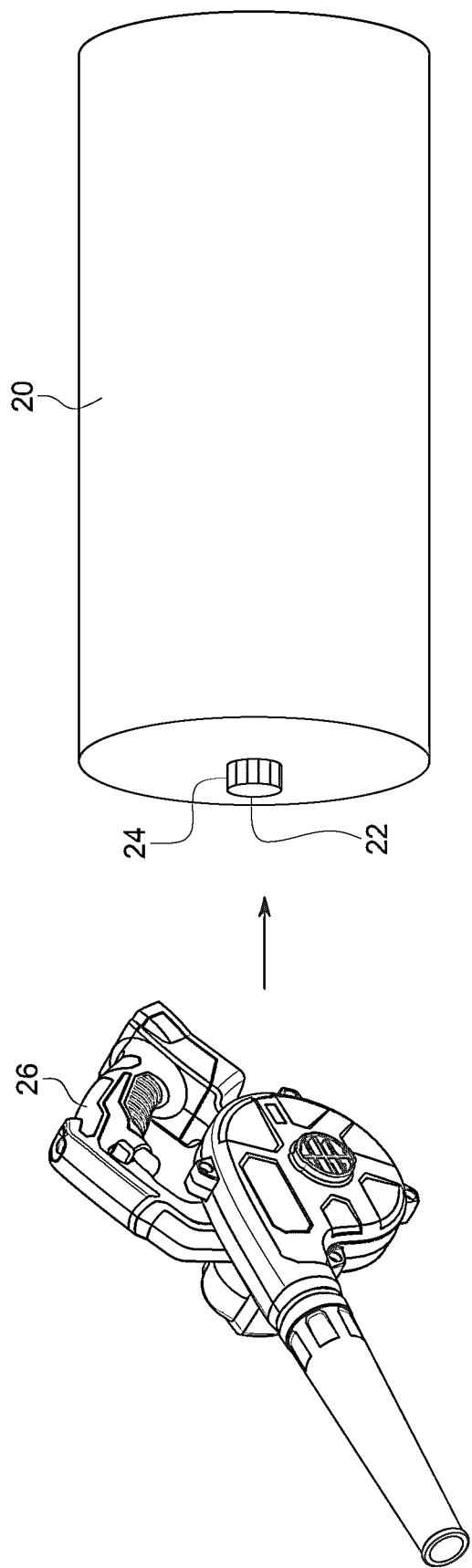
FIG. 3 is a schematic diagram of an inflatable enclosure in an inflated configuration and a blower, according to a preferred embodiment of the present invention.

Referring now to FIG. 3, in addition to FIG. 2, there is shown a schematic diagram of the inflatable enclosure 20 in an inflated configuration. The inflatable enclosure may be inflatable by means of a blower 26 through the opening 22.

Figure 4:
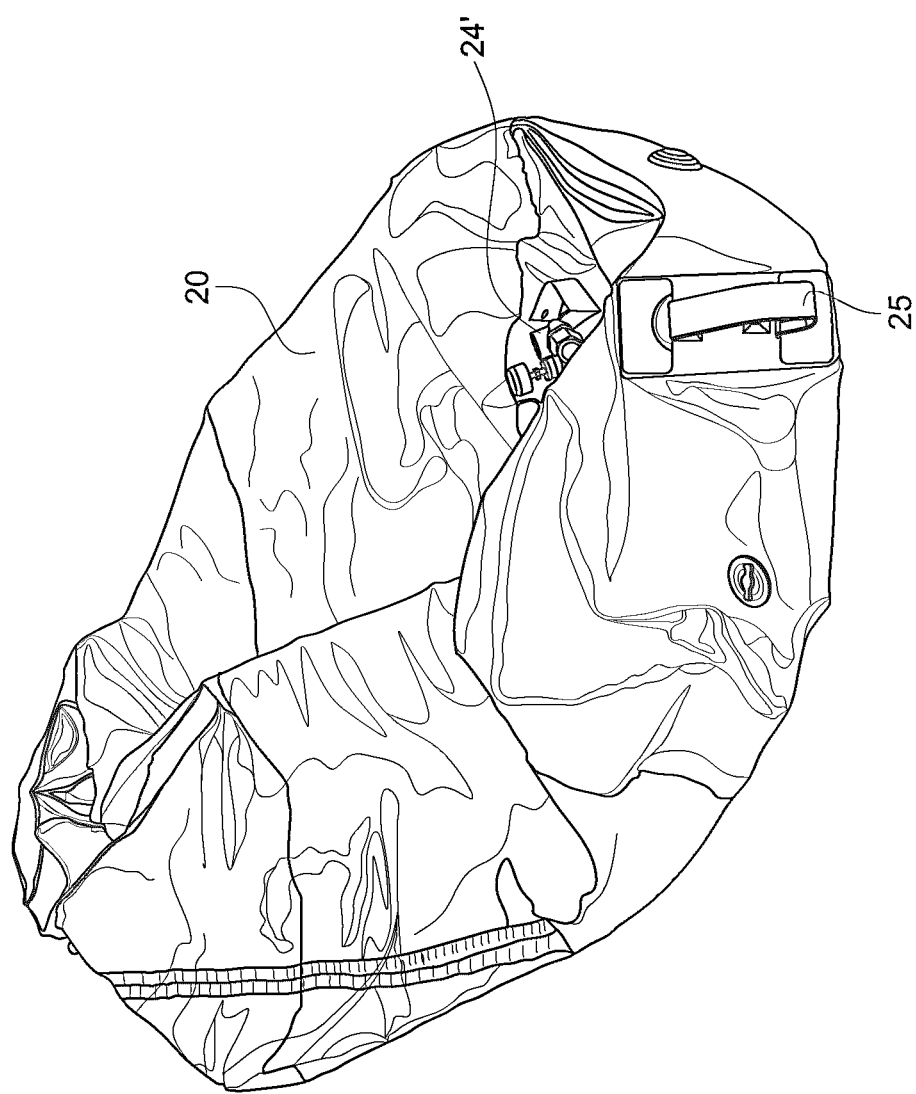
FIG. 4 is a perspective top view of an inflatable enclosure in a deflated configuration, according to a preferred embodiment of the present invention.
Figure 5:
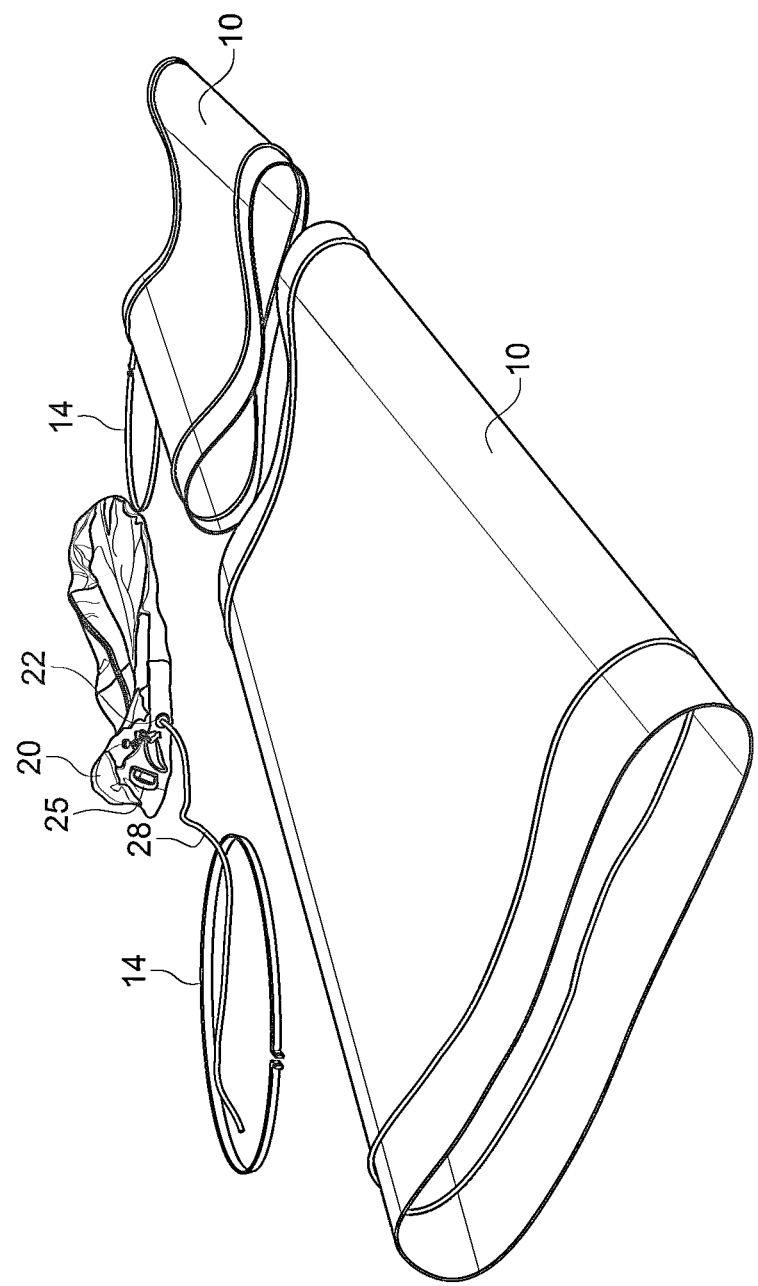
FIG. 5 is a perspective view of two duct sections in a flattened configuration and an inflatable enclosure in a deflated configuration, according to a preferred embodiment of the present invention.

Referring to FIGS. 4 and 5, in addition to FIG. 3, there is shown another example of the inflatable enclosure 20 in a deflated configuration. The inflatable enclosure 20 includes a handle 25 that may be used to pull it. There are also shown to two duct sections 10 in a flattened configuration. A hose 28 is shown connected at one end thereof to the opening 22 of the inflatable enclosure 20. The hose 28 is connected at its other end to the blower 26. The blower 26 is configured to inject pressurized air or gas into the inflatable enclosure 20 at a pressure level sufficient so as to push and shape from within the inner walls of the duct section 10.

Figure 6:
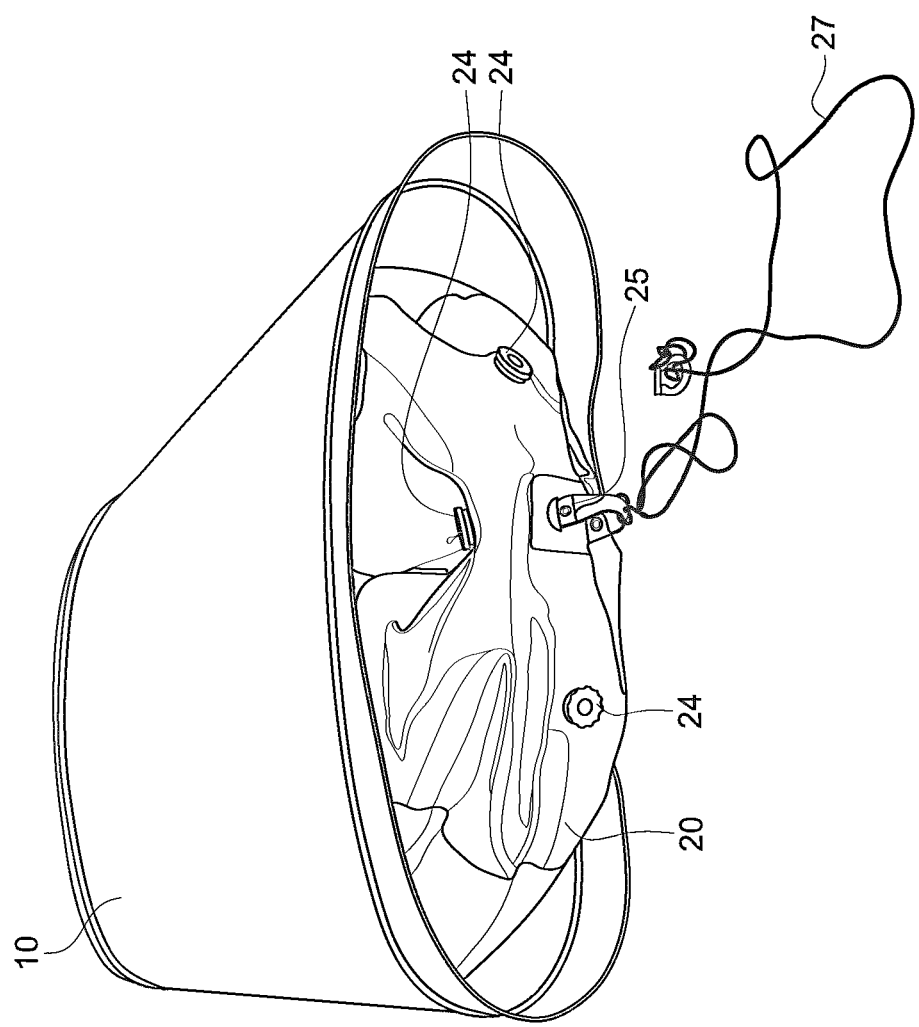
FIG. 6 is a perspective view of an inflatable enclosure in a deflated configuration being inserted within a duct section in a flatted configuration, according to a preferred embodiment of the present invention.

Referring now to FIG. 6, there is shown the inflatable enclosure 20 in a deflated configuration that has been inserted within the duct section 10 in a flatted configuration. The handle 25 may be provided with a rope 27 to assist in pulling the deflated enclosure 20 from the duct section 10.

Figure 7:
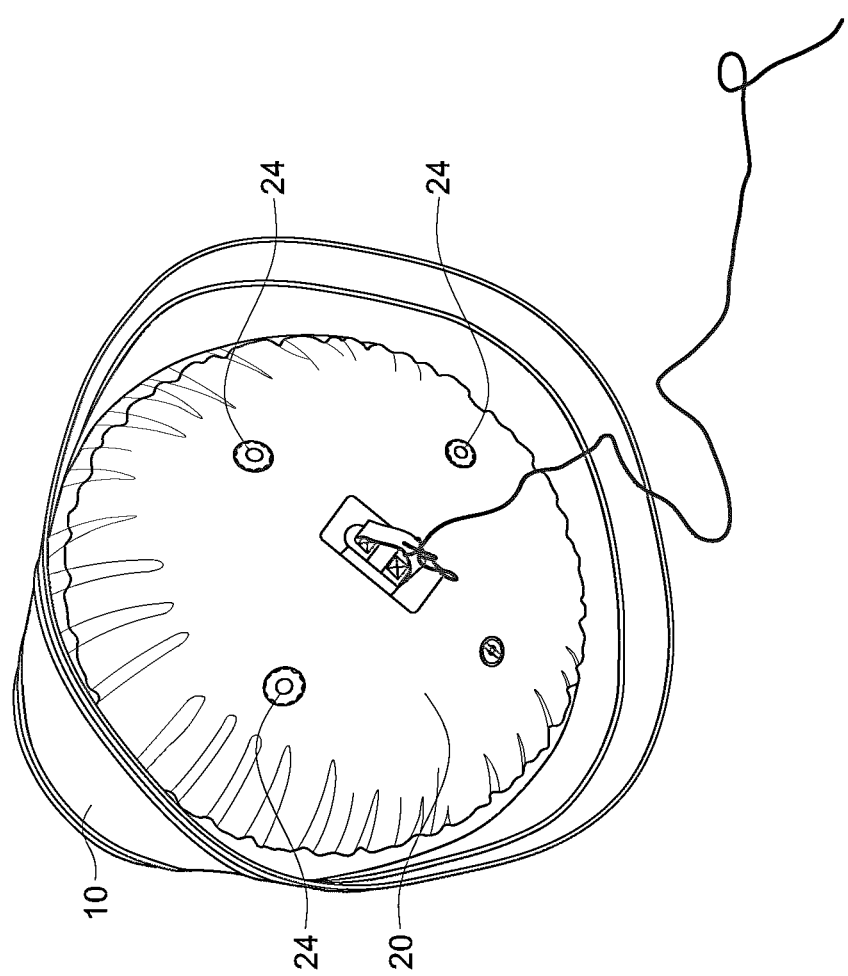
FIG. 7 is a perspective view of an inflatable enclosure in an inflated configuration being inserted within a duct section in an expanded configuration, according to a preferred embodiment of the present invention.

Referring now to FIG. 7, in addition to FIG. 6, there is shown the inflatable enclosure 20 in an inflated configuration inserted within a duct section 10 in an expanded configuration. Therefore, when the inflatable enclosure 20 is connected to the blower 26 (shown in FIG. 3), the duct section 10 expands from the flattened configuration to the expanded configuration as the inflatable enclosure 20 pushes against the duct section 10 from within.

Figure 8:
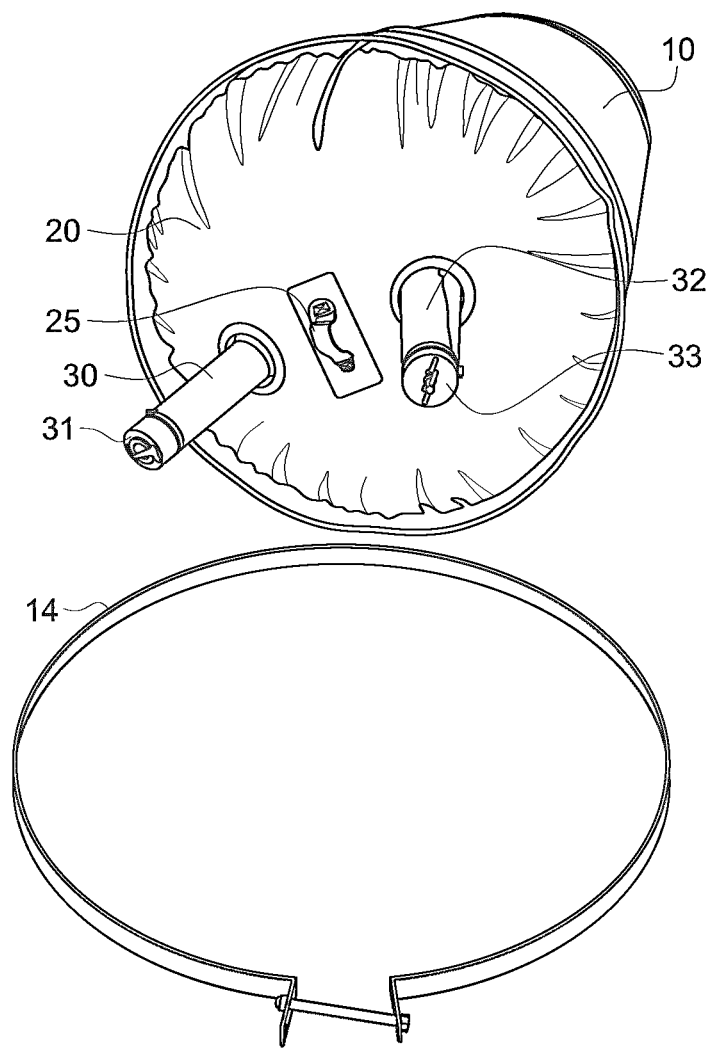
FIG. 8 is a perspective view of an inflatable enclosure in an inflated configuration being inserted within a duct section in an expanded configuration, according to a preferred embodiment of the present invention.
Figure 9:
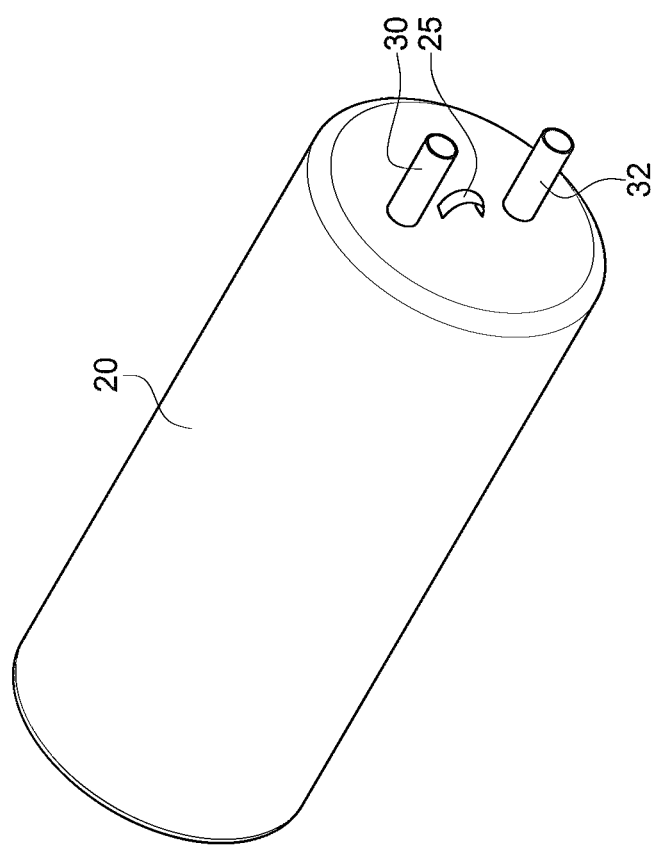
FIG. 9 is a perspective view of an inflatable enclosure in an inflated configuration, according to a preferred embodiment of the present invention.

Referring to FIGS. 8 and 9, in addition to FIGS. 1 to 6, there is shown another embodiment of the inflatable enclosure 20 in an inflated configuration inserted within a duct section 10 in an expanded configuration. The inflatable enclosure 20 includes the handle 25. The inflatable enclosure 20 includes a first tubular opening 30 provided with a cap or valve 31 and a second tubular opening 32 provided with another cap or valve 33. A metallic ring 14 is shown adjacent to the duct section 10 for subsequent installation as discussed above.

FIG. 10 illustrates different sizes of expanded configurations of a circular duct 10 and an oval duct 10'. The circular duct 10 may be shaped from 24, 30, 42, 48, 54, 60 and 72 inches in diameter. The oval duct 10' may be shaped from 40.34, 48.27, 56.60, 62.32, and 68.28 inches in diameter. Persons skilled in the art will understand that other sizes may be achieved.

Although the inflatable enclosure 20 is shown in an inflated configuration being round as seen from the end of the duct section 10, persons skilled in the art will understand that other shaped may be achieved, such as oval, or any suitable shape.

The inflatable enclosure 20 may be provided with air valves, such as the one commercialized by Defender™. The inflatable enclosure 20 may also include a Turn Tite™ pressure test plug. Any suitable air blower 26 for inflating the inflatable enclosure 20 with compressed air or other gases may be used such as the ones commercialized by Makita™ or Milwaukee Tool™ or Dewalt™.

In embodiments, a method for shaping the duct section 10 includes a first step of inserting the inflatable enclosure 20 within the duct section 10 while being in the flattened configuration. The method includes a second step of inflating the inflatable enclosure 20 with a blower 26 through the opening 22 from a deflated configuration to an inflated configuration, whereby the duct section 10 expands from the flattened configuration to the expanded configuration as the inflatable enclosure 20 pushes against the duct section 10 from within.

Once the duct section 10 has reached its expanded configuration, such as rounded or oval, metallic rings 14 (shown in FIG. 1) may be installed at the ends thereof, as is know by persons skilled in the art to maintain the expanded configuration of the duct section 10. Thereafter, the inflatable enclosure 20 may be deflated via one of its openings or valves. The deflated enclosure 20 is then removed from within of the duct section 10. The duct section 10 may thus be installed.

The main advantages of the present system and method is that these require less workers to shape the duct sections 10 and in less time than the known method of the prior art. In addition, present system and method do not require that the workers expert manual and physical force to shape the duct sections 10.

The scope of the claims should not be limited by the preferred embodiments set forth in the examples but should be given the broadest interpretation consistent with the description as a whole.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

The invention claimed is:

1. A system for shaping a semi-rigid duct section prior to installation of the semi-rigid duct section at an installation site, the semi-rigid duct section being configured to be manually shapeable, the semi-rigid duct section being configured to expand from a flattened configuration to an expanded configuration, the system comprising:
    an inflatable enclosure insertable within the semi-rigid duct section while being in the flattened configuration, prior to the installation of the semi-rigid duct section at the installation site, the inflatable enclosure defining an opening for inflating the inflatable enclosure; and
    a blower for inflating the inflatable enclosure through the opening from a deflated configuration to an inflated configuration, prior to the installation of the semi-rigid duct section at the installation site;
    wherein when the inflatable enclosure is inserted within the semi-rigid duct section, the blower inflates the inflatable enclosure through the opening from the deflated configuration to the inflated configuration, prior to the installation of the semi-rigid duct section at the installation site, whereby the semi-rigid duct section expands from the flattened configuration to the expanded configuration as the inflatable enclosure pushes against the semi-rigid duct section from within, and wherein when the inflatable enclosure is deflated via the opening then the inflatable enclosure is removed from within the semi-rigid duct section, prior to the installation of the semi-rigid duct section at the installation site;
    wherein the inflatable enclosure includes a handle for removing the inflatable enclosure from within the semi-rigid duct section.

2. The system of claim 1, comprising a cap for closing the opening and sealing the inflatable enclosure.

3. The system of claim 1, wherein the inflatable enclosure comprises plastic material, aramid material, fabric material or combinations thereof.

4. The system of claim 1, wherein the handle is provided with a rope for assisting in removing the inflatable enclosure from within the semi-rigid duct section.

5. A method for shaping a semi-rigid duct section prior to installation of the semi-rigid duct section at an installation site, the semi-rigid duct section being configured to be manually shapeable, the semi-rigid duct section being configured to expand from a flattened configuration to an expanded configuration, the method comprising:
    prior to the installation of the semi-rigid duct section at the installation site, inserting an inflatable enclosure within the semi-rigid duct section while being in the flattened configuration, the inflatable enclosure defining an opening for inflating the inflatable enclosure;
    prior to the installation of the semi-rigid duct section at the installation site, inflating the inflatable enclosure with a blower through the opening from a deflated configuration to an inflated configuration, whereby the semi-rigid duct section expands from the flattened configuration to the expanded configuration as the inflatable enclosure pushes against the semi-rigid duct section from within;
    prior to the installation of the semi-rigid duct section at the installation site, deflating the inflatable enclosure via the opening; and
    after said deflating, prior to the installation of the semi-rigid duct section at the installation site, removing the inflatable enclosure from within the semi-rigid duct section.

6. The method of claim 5, comprising closing the opening with a cap or valve for sealing the inflatable enclosure.

7. The method of claim 5, comprising installing a ring around an end of the semi-rigid duct section to maintain the expanded configuration of the semi-rigid duct section.

8. The method of claim 6, comprising deflating the inflatable enclosure after the semi-rigid duct section has reached the expanded configuration.

9. The method of claim 5, wherein the inflatable enclosure includes a handle and said removing includes pulling the inflatable enclosure by the handle.

10. The method of claim 9, wherein the handle is provided with a rope and said removing includes pulling the inflatable enclosure by the rope.

* * * * *